United States Patent [19]

Mash

[11] 4,331,868
[45] May 25, 1982

[54] MOUNTING SYSTEM FOR OPTICAL CONTROLS

[76] Inventor: William R. Mash, 1903 NE. Sawdust Hill Rd., Poulsbo, Wash.

[21] Appl. No.: 121,329

[22] Filed: Feb. 14, 1980

[51] Int. Cl.³ .............................................. H01J 5/02
[52] U.S. Cl. ..................................... 250/239; 250/221
[58] Field of Search ........................ 250/239, 221, 222

[56] References Cited

U.S. PATENT DOCUMENTS

| | | | |
|---|---|---|---|
| 3,619,629 | 11/1971 | Matthews | 250/239 X |
| 3,653,021 | 3/1972 | Litman et al. | 250/239 X |
| 3,679,906 | 7/1972 | Myers | 250/221 X |
| 4,021,665 | 3/1977 | Haas et al. | 250/239 |
| 4,173,717 | 11/1979 | Lederer | 250/239 |

Primary Examiner—David C. Nelms
Assistant Examiner—Edward P. Westin
Attorney, Agent, or Firm—Cole, Jensen & Puntigam

[57] ABSTRACT

Standardized housing package for pulsed LED photoelectric controls optical control systems, in which the housing can be interchangeably used for any of the three basic scanning modes for optical controls, namely, through-beam, proximity, or reflex detection. The housing consists of a single, whole or two modular half-spherical head units which are received and supported in a main housing unit configured internally to receive the modular round head member.

1 Claim, 14 Drawing Figures

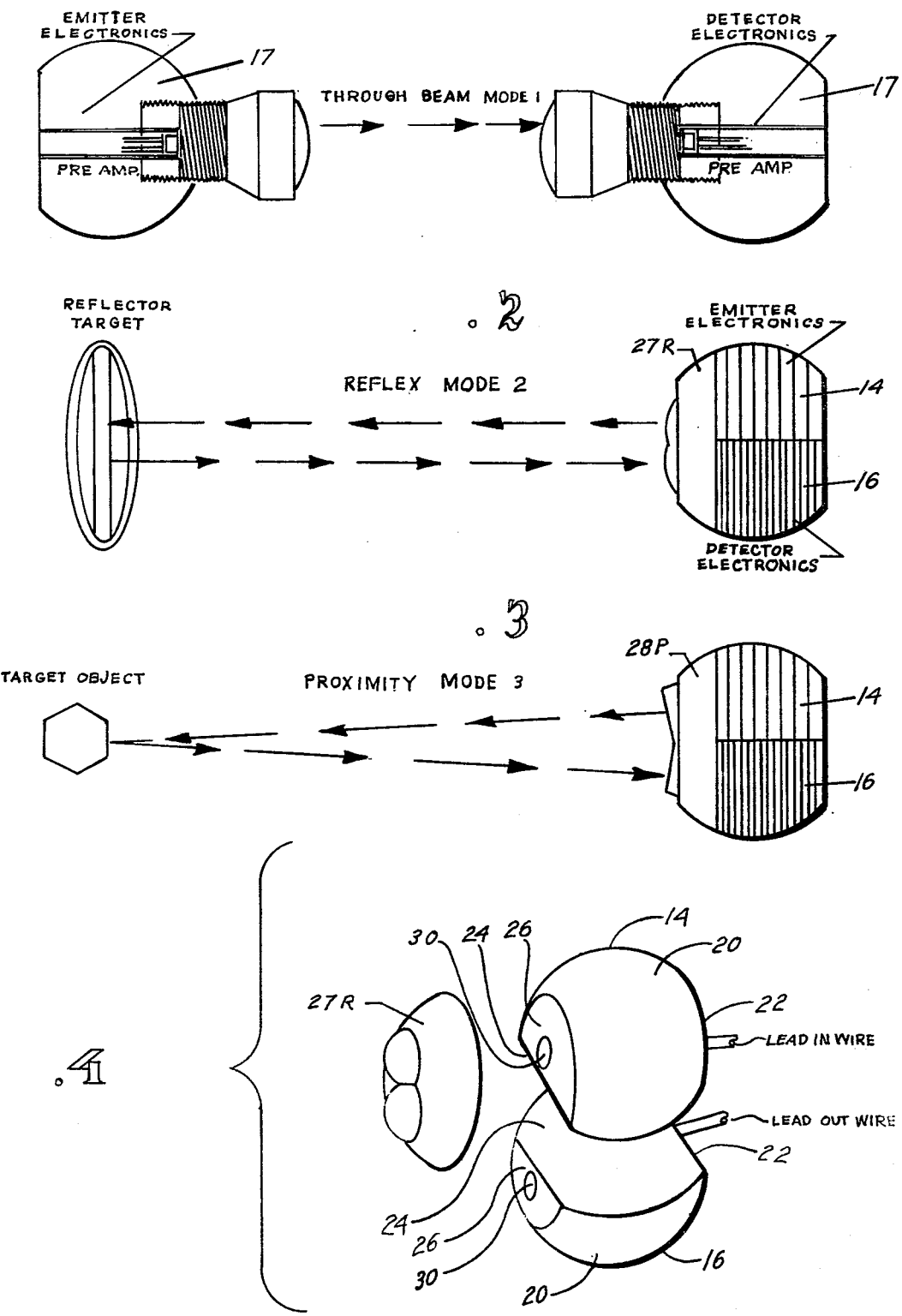

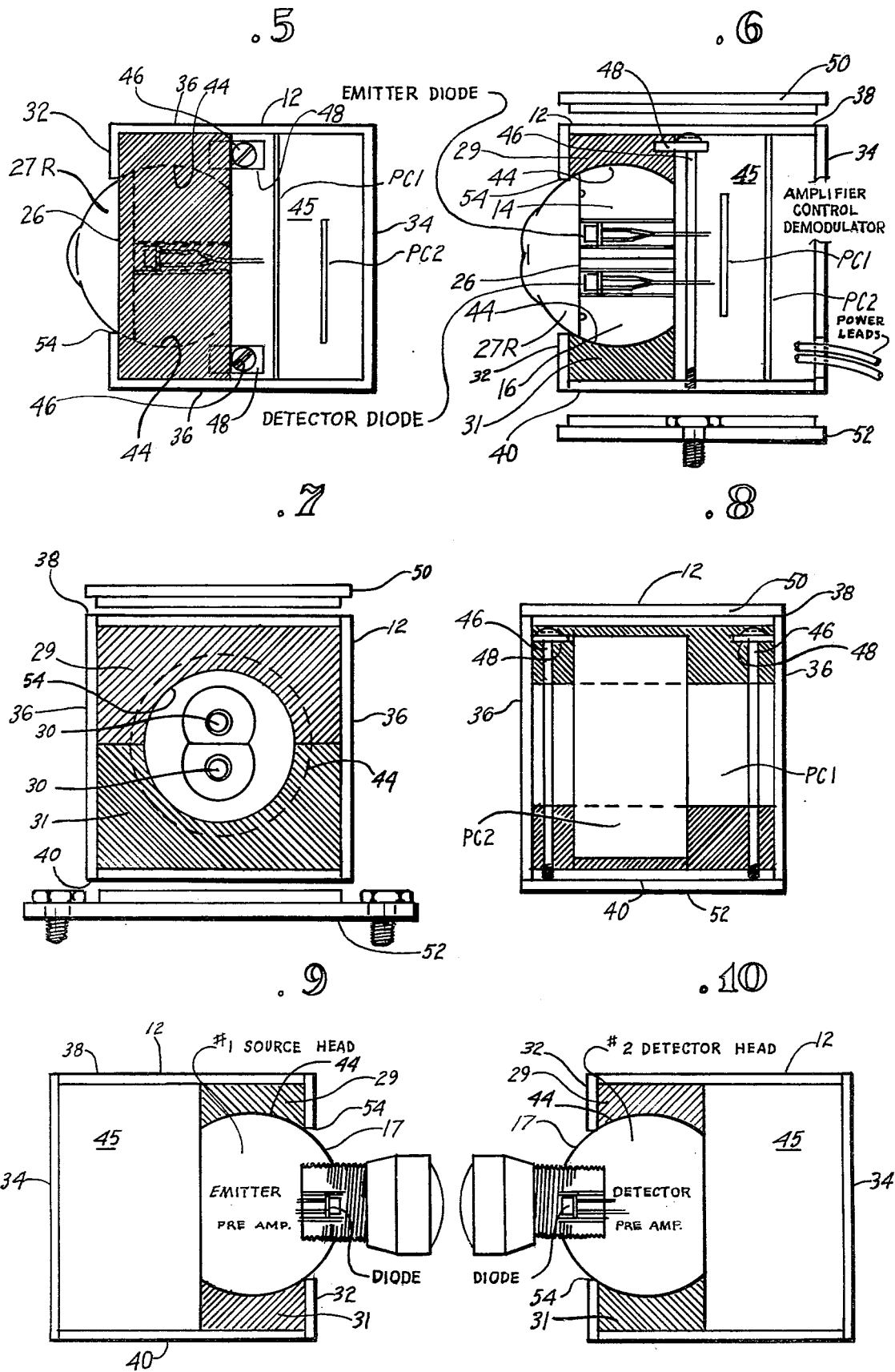

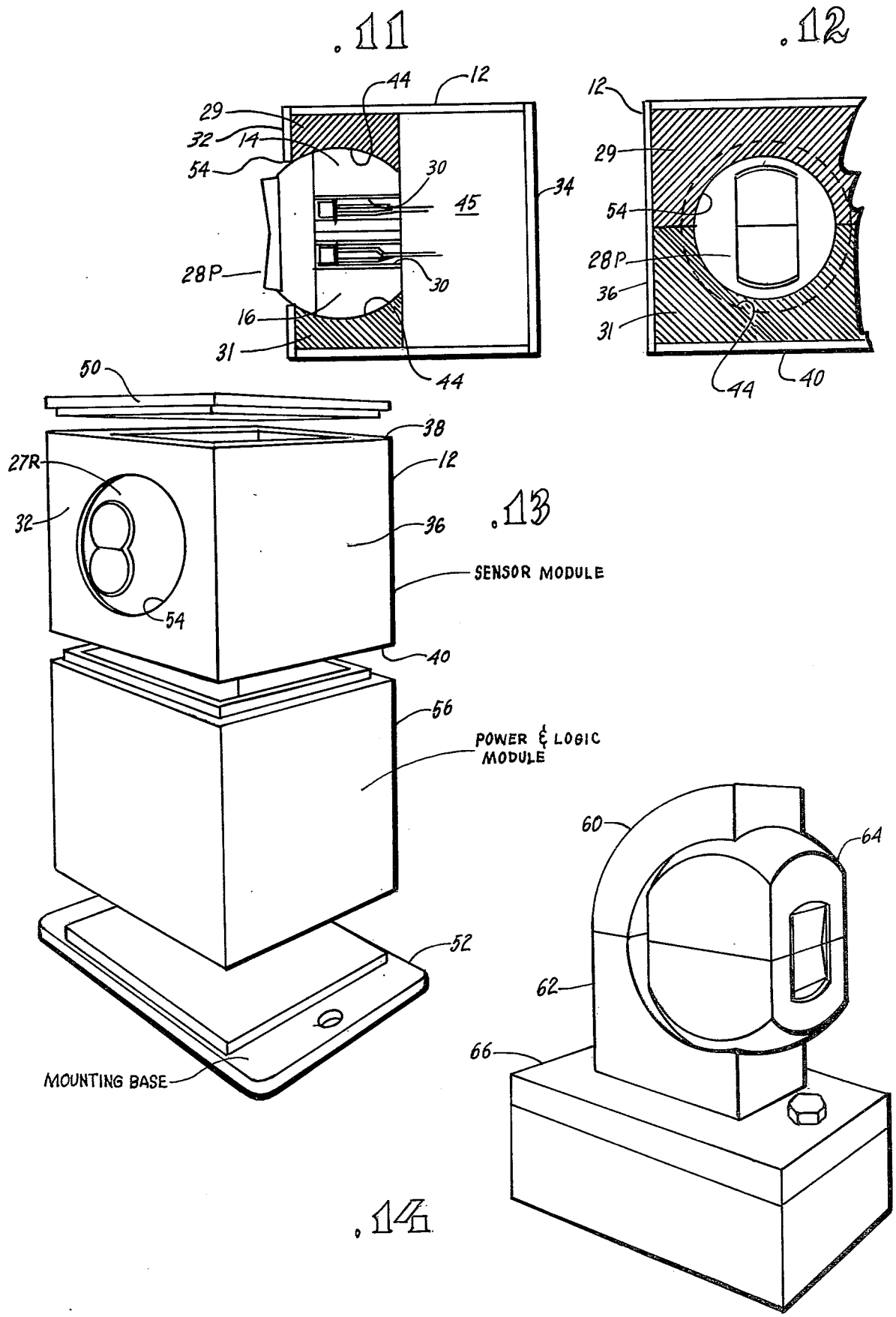

MOUNTING SYSTEM FOR OPTICAL CONTROLS

BACKGROUND OF THE INVENTION

The invention relates generally to the area of pulsed LED photoelectric control systems and more particularly to a universal or standard housing system for interchangeably mounting the electrical components in any of the three basic optical control scanning modes.

Those skilled in the art are aware of the available optical control systems produced and which are sold in the market place. Generally speaking, different applications, and the type of scanning mode which will be used, determine the control configuration which will be employed for such special application. Accordingly, there are a wide variety of housing sizes for the light source and detector components as well as other solid-state modules such as the modular, output devices, amplifier demodulator and other components which may be needed in a given control application.

The lack of standardized housing and mounting means for known controls is such that the number of different products in different housings contributes to the redundancies in controls currently available in the marketplace. In fact, no standardized or universal modular housing and/or mounting means for the various modes of optical scanning are available.

SUMMARY OF THE INVENTION

Standardized optical control housing system utilizing a single sphere or two modular, half-sphere, limited, swivel head components. The sphere and halfsphere heads may be a detector or an emitter. The heads comprise at least a partial spherical surface which co-acts with an internal housing or rocket surface to permit a limited amount of swivel movement for simple alignment. The sphere and socket retainers are enclosed in a housing which contains at least some of the electronics for the optical controls. The unique housing and mounting design enables a single standardized housing design to be used for any one of the three basic photoelectric scanning control modes. Lenses required for the particular scanning mode used are included as part of the mounting concept.

Accordingly, it is among the many features, advantages and objects of the invention to provide a standardized housing and mounting system for photoelectric controls which will replace a number of different products in different housings. The system enables the same number of products to be contained, housed or mounted within a common or modular type package. The system is uniquely adaptable to all three scanning modes due to a whole or to a mating, half-ball, swivel head concept. This system is extremely flexible and because of the standardized nature of the housing and mounting systems provides significant economic advantages for pulsed LED, photoelectric controls. This system is adaptable to a wide variety of applications and users' needs. The system is simple and reliable and permits control installations to be more quickly put in position and aligned. The system is easily aligned because of the swivel design. The invention has a great number of applications, in that it can be used in a variety of industries, materials handling situations, monitoring, metering, level determining, counting, sorting, alignment, surveilance, identification and warning applications in which non-contact type control is desired. The sphere and socket modularity includes the lens portion and allows swiveling up to about 20° as a simple, built-in function. A single housing is thus interchangeably usable for all scanning modes.

BRIEF DESCRIPTION OF DRAWINGS

FIG. 1 shows diagrammatically a through-beam mounting arrangement of the invention;

FIG. 2 shows diagrammatically a reflex mode mounting application;

FIG. 3 shows diagrammatically a proximity scanning mode application;

FIG. 4 shows the split or half-sphere component design for containment of electronics as well as the lens portion;

FIG. 5 is a top plan view in partial cross-section showing the spherical head in the socket or main housing and further illustrating the location of the electronics;

FIG. 6 is a side elevational view in partial cross-section showing further mounting details of the half-spheres within the principal housing;

FIG. 7 is a front elevational view showing additional details of the housing;

FIG. 8 is a rear elevational view showing additional details of the housing and mounting;

FIGS. 9 and 10 illustrate a through-beam application using a single sphere head;

FIG. 11 shows the invention in a proximity scanning mode using a double half sphere head;

FIG. 12 shows a front elevational detail of the proximity mode indicated in FIG. 11;

FIG. 13 shows the snap-on modularity capability of the system with additional electronic components attached to the main housing;

FIG. 14 shows a modified version or embodiment of the principal housing for containing the whole or modular half-sphere heads.

DESCRIPTION OF PREFERRED EMBODIMENT

With reference to FIGS. 1 through 3, it will be appreciated that FIG. 1 shows pictorially a through-beam, which is a method of object detection in which a source is mounted on one side and a detector is mounted on the other. An object is detected when it "breaks" the beam.

The reflex scanning mode, shown in FIG. 2, is a method of detection in which the source and detector are located on the same side. A retro-reflective target on the far side returns the energy from the source to the detector, unless the signal is broken or interferred with by an object. The retro-reflector is specially constructed to reflect energy back in the direction from which it came, independently of small angle deviations.

Proximity detection, as shown in FIG. 3, senses energy that is scattered by the object as it passes in front of the source beam. Detection occurs when an object enters a region where the source and detector beams cross.

FIGS. 4 through 10 show details of the construction of the three basic modular components, namely, the support housing, generally designated by the number 12, the upper half-sphere generally designated by the number 14, the lower half-sphere generally designated by the number 16, and a whole sphere identified by the number 17.

The half-spheres are identical elements in design and configuration except for the sensor, e.g. emitter or detector circuitry contained therein. Each half-sphere will include an outside spherical surface 20, a truncated rear surface 22, a flat abutment or mating surface 24, and a front truncated, flat planar surface 26 which mates with lens 27R or lens 28P and which are held together by socket retainer members 29 and 31. The lenses are held in place when the spheres are inside the mounting housing 12. The sphere or half-sphere heads will be plastic, each with a cavity 30. The plastic heads will receive either the potted light-emitting source head electronics, the detector head electronics or will simply be a single spherical sensor holder as in the through-beam scanning mode. It will be appreciated that the single sphere, through-beam head could also be made of split sphere heads.

The mounting housing will be a generally rectangular, hollow container having a front surface 32, a rear surface 34, side surfaces 36, a top surface 38, and a bottom surface 40. The housing is provided with a removable top lid 50 and a base 52 and will be open at the top and bottom for easy insertion of the parts. An opening 54 is formed in the front surface 32. The arrangement of parts gives the invention a capability for swiveling approximately 20°. Inside the housing 12 are interior spherical surfaces 44 of socket retainer members 29 and 31 for co-acting with surfaces 20 on the heads. A cavity 45 is provided at the rear of the housing 12 to receive electrical circuitry such as printed circuit boards PC1 and PC2, shown as examples in FIGS. 5 and 6. It will be seen that the housing includes lock bolts 46 with clips 48 for tightening the spheres firmly in position between retainers 29 and 31 once they are properly located and aligned. Top lid 50 and base 52 are secured to housing 12 with screws (not shown).

FIGS. 9 and 10 show a through-beam arrangement of the invention in which spheres 17 hold a detector in one housing and an emitter in the other. The lens barrel and preamplifiers are shown as being threaded into the head although they could be potted or secured in position by other means. FIGS. 11 and 12 show a proximity mode application in which either spherical half may be the source and the other spherical half the detector part of the head.

FIG. 13 shows the head housing 12 mounted on a power and logic module which may be needed for some applications to augment the emitter-detector parts.

FIG. 14 shows an alternative manner of housing the sphere halves without completely enclosing the spheres as is essentially done in FIGS. 1 through 13. This embodiment is comprised of partial socket retainers 60 and 62 and partial sphere 64 which can also be a single or split member. The support retainers 60 and 62 are mounted on base 66.

What is claimed is:

1. Standardized housing and mounting means for photoelectric control systems using any one of through-beam, proximity and reflex scanning modes and containing at least one of a light-emitter and a light detector component:
   (a) an outer housing of generally rectangular configuration on the exterior thereof and provided on the interior with retainer socket means having two opposed and spaced apart partial spherical engagement surfaces to define a partial ball socket, said outer housing also including cavity means therein for containment of electrical circuitry and further including a front opening therein to accommodate the passage of photoelectric light beams into and out of the interior of said housing,
   (b) spherical mounting means comprising at least a partial spherical member received in said partial ball socket and having sufficient spherical surface to coact with said partial ball socket in said outer housing to enable said partial spherical member to swivel a predetermined amount, said partial spherical member also having a generally flat planar front lens engaging surface registering with said housing opening, said lens engaging surface being inside said housing such that a portion of said spherical engagement surfaces are engageable by lens means, said spherical mounting means having cavity opening means to said lens engaging surface for receiving said at least one of a light emitter and a light detector component,
   (c) lens means engageable with said lens engaging surface and also engageable with said spherical engagement surfaces inside said housing and alignable with said cavity opening means,
   (d) detachable securing means for holding said partial spherical member firmly in place within said retainer socket means; and
   (e) said partial spherical member being comprised of a pair of mating, at least partial half-sphere members of which each may be provided with cavity opening means.

* * * * *